(12) United States Patent
Brown et al.

(10) Patent No.: US 10,781,800 B2
(45) Date of Patent: Sep. 22, 2020

(54) CENTRING CONTROL OF AN SMA ACTUATION ASSEMBLY

(71) Applicant: CAMBRIDGE MECHATRONICS LIMITED, Cambridge, Cambridgeshire (GB)

(72) Inventors: Andrew Benjamin David Brown, Cambridge (GB); Daniel John Burbridge, Cambridge (GB); John Grayley, Cambridge (GB); Igor Gotlibovych, Cambridge (GB); Thomas Matthew Gregory, Cambridge (GB)

(73) Assignee: CAMBRIDGE MECHATRONICS LIMITED, Cambridge, Cambridgeshire (GB)

( * ) Notice: Subject to any disclaimer, the term of this patent is extended or adjusted under 35 U.S.C. 154(b) by 100 days.

(21) Appl. No.: 16/301,648

(22) PCT Filed: Jun. 7, 2017

(86) PCT No.: PCT/GB2017/051651
§ 371 (c)(1),
(2) Date: Nov. 14, 2018

(87) PCT Pub. No.: WO2017/212262
PCT Pub. Date: Dec. 14, 2017

(65) Prior Publication Data
US 2019/0120214 A1    Apr. 25, 2019

(30) Foreign Application Priority Data
Jun. 8, 2016    (GB) .................................. 1610039.8

(51) Int. Cl.
*F03G 7/06*    (2006.01)
*H04N 5/225*    (2006.01)
(Continued)

(52) U.S. Cl.
CPC ............... *F03G 7/065* (2013.01); *G03B 3/10* (2013.01); *G03B 5/02* (2013.01); *G03B 5/04* (2013.01);
(Continued)

(58) Field of Classification Search
None
See application file for complete search history.

(56) References Cited

U.S. PATENT DOCUMENTS

| 4,977,886 A | 12/1990 | Takehana et al. |
| 5,459,544 A | 10/1995 | Emura |

(Continued)

FOREIGN PATENT DOCUMENTS

| EP | 2003489 A2 | 12/2008 |
| EP | 2375069 A1 | 10/2011 |

(Continued)

OTHER PUBLICATIONS

International Search Report and Written Opinion of the ISA for PCT/GB2017/051651, ISA/EP, Rijswijk, NL, dated Aug. 29, 2017.

*Primary Examiner* — Cynthia Segura
(74) *Attorney, Agent, or Firm* — Harness, Dickey & Pierce, P.L.C.

(57) ABSTRACT

An SMA actuation assembly comprising SMA actuator wires connected in tension between a support structure and a movable element is controlled to drive movement of the movable element with respect to the support structure by supplying drive signals to the SMA actuator wire. Target signals representing desired positions of the movable element are set, varying within a predetermined spatial envelope. Measures of resistance of the SMA actuator wires are derived and the power of the drive signals is controlled under closed loop control on the basis of the target signals and feedback signals obtained from the measures of resis- (Continued)

tance. Electrical characteristics of the SMA actuator wires are monitored and used to detect when a motion limit of the movement is reached. In response thereto, the spatial envelope is adjusted to restrict the movement to be within the detected motion limit.

20 Claims, 4 Drawing Sheets

(51) Int. Cl.
    *G03B 3/10*     (2006.01)
    *G03B 5/02*     (2006.01)
    *G03B 5/04*     (2006.01)
    *G03B 13/34*     (2006.01)

(52) U.S. Cl.
    CPC ........... *G03B 13/34* (2013.01); *H04N 5/2257* (2013.01); *G03B 2205/0015* (2013.01); *G03B 2205/0076* (2013.01)

(56) References Cited

U.S. PATENT DOCUMENTS

| | | | |
|---|---|---|---|
| 7,650,752 B2 | 1/2010 | Oohara | |
| 2001/0025477 A1* | 10/2001 | Hara | F03G 7/065 60/772 |
| 2003/0079472 A1 | 5/2003 | Hara et al. | |
| 2006/0048511 A1 | 3/2006 | Everson et al. | |
| 2006/0150627 A1 | 7/2006 | Oohara | |
| 2006/0209195 A1 | 9/2006 | Goto | |
| 2007/0109412 A1 | 5/2007 | Hara | |
| 2008/0247748 A1 | 10/2008 | Tanimura et al. | |
| 2008/0278030 A1 | 11/2008 | Hara et al. | |
| 2008/0278590 A1* | 11/2008 | Tanimura | G03B 3/10 348/208.99 |
| 2009/0009656 A1 | 1/2009 | Honda et al. | |
| 2009/0052037 A1 | 2/2009 | Wernersson | |
| 2009/0301077 A1* | 12/2009 | Takahashi | F03G 7/065 60/528 |
| 2010/0060776 A1* | 3/2010 | Topliss | G02B 7/08 348/340 |
| 2010/0257859 A1 | 10/2010 | Honda | |
| 2010/0275592 A1* | 11/2010 | Topliss | G03B 5/00 60/528 |
| 2010/0320943 A1 | 12/2010 | Honda | |
| 2011/0031924 A1 | 2/2011 | Honda | |
| 2011/0032628 A1 | 2/2011 | Tanimura et al. | |
| 2011/0242398 A1 | 10/2011 | Honda et al. | |
| 2012/0019675 A1 | 1/2012 | Brown | |
| 2014/0055630 A1 | 2/2014 | Gregory et al. | |

FOREIGN PATENT DOCUMENTS

| | | |
|---|---|---|
| GB | 2475388 A | 5/2011 |
| JP | 2006329146 A | 12/2006 |
| JP | 2007315352 A | 12/2007 |
| JP | 2009086142 A | 4/2009 |
| WO | WO-2005026539 A2 | 3/2005 |
| WO | WO-2005075823 A1 | 8/2005 |
| WO | WO-2006105588 A1 | 10/2006 |
| WO | WO-2007018086 A1 | 2/2007 |
| WO | WO-2007113478 A1 | 10/2007 |
| WO | WO-2008099156 A2 | 8/2008 |
| WO | WO-2008/129291 A2 | 10/2008 |
| WO | WO-2009056822 A2 | 5/2009 |
| WO | WO-2009/071898 A2 | 6/2009 |
| WO | WO-2010029316 A2 | 3/2010 |
| WO | WO-2010049689 A2 | 5/2010 |
| WO | WO-2010058177 A2 | 5/2010 |
| WO | WO-2010073902 A1 | 7/2010 |
| WO | WO-2010/089529 A1 | 8/2010 |
| WO | WO-2011/104518 A1 | 9/2011 |
| WO | WO-2012/038703 A2 | 3/2012 |
| WO | WO-2012/066285 A1 | 5/2012 |
| WO | WO-2013/175197 A1 | 11/2013 |
| WO | WO-2014/076463 A1 | 5/2014 |
| WO | WO-2014/083318 A1 | 6/2014 |
| WO | WO-2017/098249 A1 | 6/2017 |

* cited by examiner

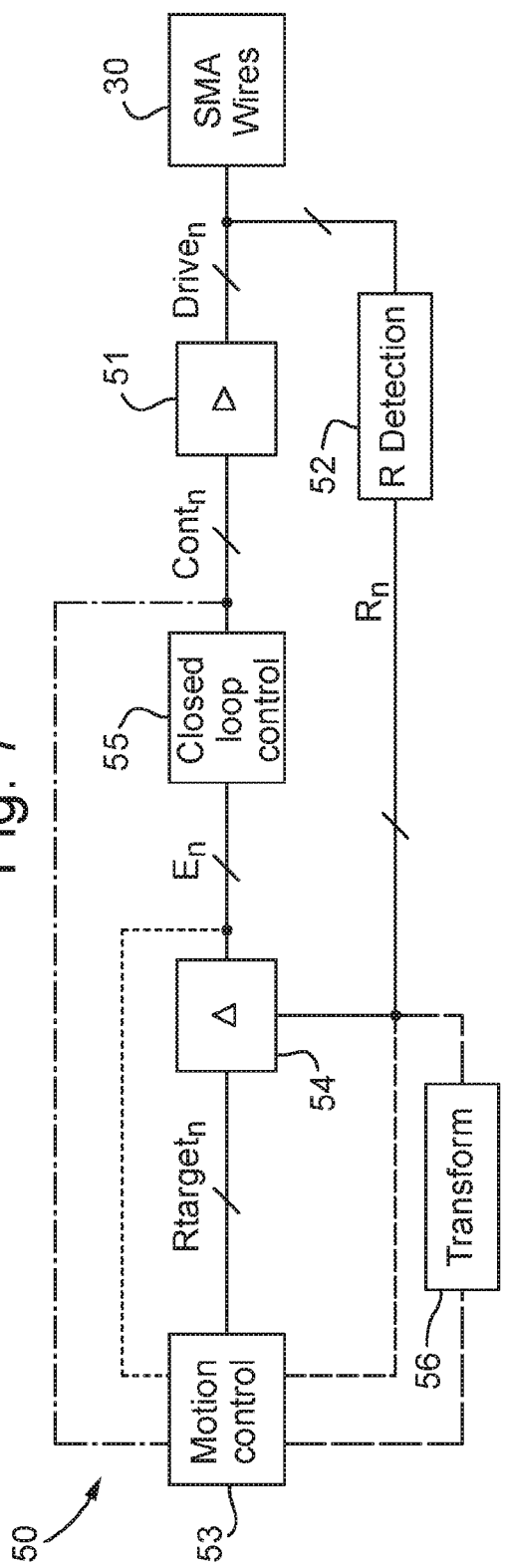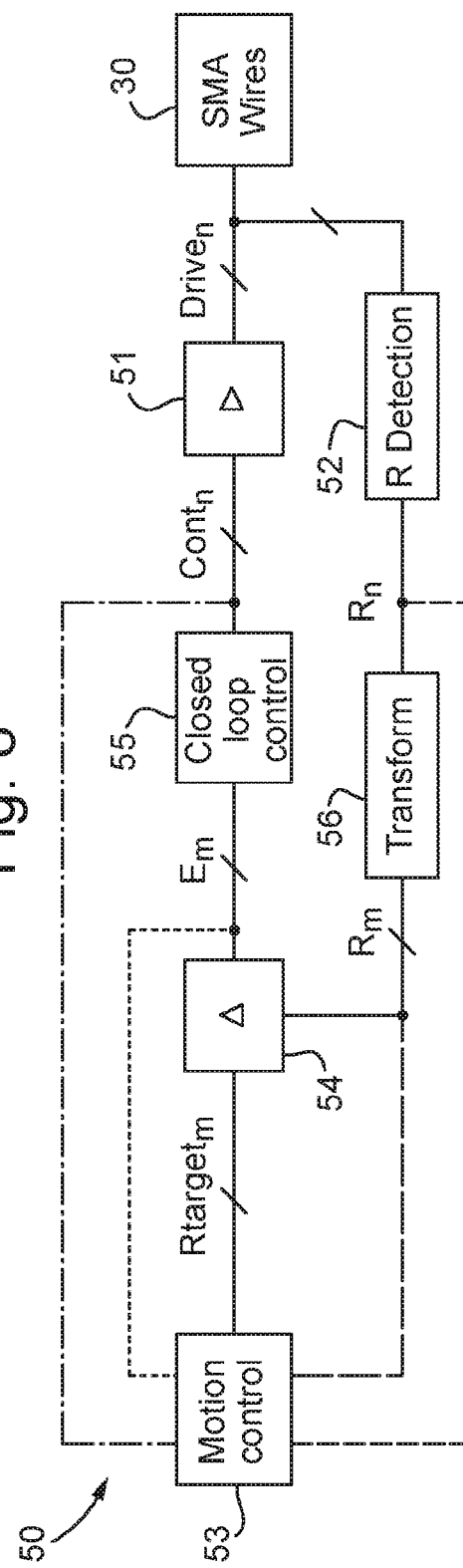

CENTRING CONTROL OF AN SMA ACTUATION ASSEMBLY

CROSS-REFERENCE TO RELATED APPLICATIONS

This application is a 371 U.S. National Stage of International Application No. PCT/GB2017/051651, filed Jun. 7, 2017, which claims the priority to British Patent Application No. GB 1610039.8, filed on Jun. 8 2016. The entire disclosures of the above applications are incorporated herein by reference.

The present invention relates to control of a shape memory alloy (SMA) actuation assembly using at least one SMA actuator wire to drive movement of a movable element with respect to a support structure.

SMA actuator wires may be connected in tension between a support structure and a movable element to drive movement of the movable element with respect to the support structure on contraction thereof. Use of SMA actuator wires has numerous advantages compared to other types of actuator, particularly for miniature devices. Such advantages include provision of high forces in compact arrangements.

In many types of SMA actuation assembly, plural SMA actuator wires are connected in an arrangement in which the SMA actuator wires are capable of driving movement of the movable element with respect to the support structure with plural degrees of freedom. Such movement may be translational or rotational movement. This allows complex movements to be driven which is useful in many applications.

In one type of application, SMA actuation assemblies may be used in miniature cameras to effect focus, zoom or optical image stabilization (OIS). By way of example, WO-2011/104518, WO-2012/066285, WO-2014/076463 disclose SMA actuation assemblies employing eight SMA actuator wires that provide translational movement with three degrees of freedom and also rotational movement with three degrees of freedom. In the case that the movable element is a movable element, these SMA arrangements are capable of changing the focus and providing OIS. In other examples, WO-2013/175197 and WO-2014/083318 disclose SMA actuation assemblies employing four SMA actuator wires that provide translational movement with two degrees of freedom and also rotational movement with two degrees of freedom. In the case that the movable element is a movable element, these SMA arrangements are capable of providing OIS.

SMA actuator wires used in actuator assemblies that provide a compact design are often very fine, being typically a few tens of microns in diameter. In common with many materials, the use of fine SMA actuator wires means that there is a risk of structural or functional fatigue if the wire is subjected to either too high a strain or as a result of repeated cyclic loading. The combination of repeated cyclic loading at a high strain can lead to a rapid failure either by fracturing the wire or by a significant loss of the range of movement in the actuator. It is therefore desirable to limit the range of motion of the actuator so that the device performs with a good level of reliability.

The power of the drive signals may be varied under closed loop control on the basis of target signals and feedback signals obtained from the derived measures of resistance of the SMA actuator wires. This provides accurate control within certain motion limits. However, when such SMA actuation assemblies are manufactured in practice, there may be variance in the response. For example, manufacturing tolerances result in variance between different manufactured SMA actuation assemblies which are nominally the same. Also, there may be variance in the response of the SMA actuator wires over time, for example due to operation in different thermal environments and due to aging over their lifetime.

Such variance creates difficulty in controlling an SMA actuator assembly reliably and repeatably, especially while minimising the risk of fatigue. For example, if the control uses a reference position around which the movable element is made to move, the position of the reference position and the available range of motion may vary in an unknown manner.

One approach is to determine motion limits during a one-off initiation phase, for example during the manufacturing process. However, this is not effective for control over the lifetime of the SMA actuator assembly, as the behaviour of SMA actuator wires varies over time, as described above, and so the motion limits therefore are susceptible to drift.

Another approach is to measure the available range of motion in an initial calibration stage after power-up of the SMA actuator assembly, whereby the power of the drive signal to each SMA element is varied in open loop and to drive the wire between its motion limits and to record the position or a parameter such as wire resistance that represents that position limits. However, this takes time and so delays the time at which the actuator can be ready for use after power-up. In many applications, for example an actuator assembly in a camera unit for a portable electronic device such as a mobile phone, such a delay is unacceptable, because in general a camera user needs to use the camera unit immediately.

Another method to limit the range of motion is to apply restrictive motion limits that are sufficiently narrow restrict the motion to be within the actual motion limits experienced for all possible variances between SMA actuation assemblies manufactured to a particular design and over time. However, such an approach significantly reduces the motion that is available to the actuator assembly and so restricts the performance.

According to an aspect of the present invention, there is provided a method of controlling an SMA actuation assembly wherein at least one SMA actuator wire is connected in tension between a support structure and a movable element in an arrangement capable of driving movement of the movable element with respect to the support structure, the method comprising: while supplying drive signals to the at least one SMA actuator wire to drive said movement: setting target signals representing desired positions of the movable element with respect to the support structure that vary within a predetermined spatial envelope; deriving measures of resistance of the at least one SMA actuator wire, and controlling the power of the drive signals under closed loop control on the basis of the target signals and feedback signals obtained from the derived measures of resistance, monitoring electrical characteristics of the at least one SMA actuator wire; and detecting on the basis of the monitored electrical characteristics when a motion limit of the movement driven by the at least one SMA actuator wire is reached, and in response thereto adjusting said spatial envelope to restrict the movement to be within the detected motion limit.

Resistance-based closed loop control is applied to the control of the drive signals on the basis of the target signals representing desired positions and feedback signals obtained from the derived measures of resistance. The target signals are therefore set to control the position of the movable element in whatever manner is desired for the application concerned. The target signals are set to vary within a predetermined spatial envelope. The spatial envelope therefore limits the range of positions to which the movable element may be moved.

While supplying such drive signals under such resistance-based closed loop control, electrical characteristics of the at least one SMA actuator wire are monitored and it is detected on the basis of the monitored electrical characteristics when a motion limit of the movement driven by the at least one SMA actuator wire is reached. Such motion limits may be detected from various electrical characteristics as discussed below. In response to detecting such a motion limit, the spatial envelope is adjusted so as to restrict the movement to be within the detected motion limit. In this manner, the spatial envelope may be varied dynamically in use. This effectively allows the available range of the motion to be maximised without the need for calibration during a one-off initiation phase or an initial calibration stage after power-up of the SMA actuator assembly. The initial predetermined spatial envelope need not be overly restricted to accommodate all possible variance, because it is varied dynamically in use.

The method may be applied to a type of resistance-based closed loop control wherein the feedback signals comprise the derived measures of resistance of each of the SMA actuator wires, and the target signals comprise target measures of resistance of each of the SMA actuator wires.

Alternatively, where the SMA actuator wires are in an arrangement including opposed SMA actuator wires capable of driving movement of the movable element in opposite directions within one or more degrees of freedom, the method may be applied to a type of resistance-based closed loop control wherein the feedback signals comprise differential measures of resistance in respect of the or each degree of freedom derived from the opposed SMA actuator wires that drive movement within that degree of freedom, and the target signals comprise target signals in respect of the or each degree of freedom.

It has been appreciated that motion limits may be detected from various electrical characteristics, some examples of which are as follows.

Generally, it may be detected that a motion limit is reached on the basis of the monitored electrical characteristics being indicative of the closed loop control entering a non-linear region.

In one possible approach, the electrical characteristics that are monitored may comprise the derived measures of resistance. In this case, the electrical characteristics that are monitored may also comprise the powers of the drive signals. It may be detected that a motion limit is reached on the basis of errors between the powers of the drive signals and the derived measures of resistance. In this case, may be detected that a motion limit is reached on the basis of errors between the feedback signals and the target signals.

The method may in general be applied to any type of SMA actuation assembly. However, particular advantage arises where the method is applied to an SMA actuation assembly provided in a camera unit comprising an image sensor, wherein the movable element comprises a camera lens element arranged to focus an image on the image sensor. The camera lens element may comprise one or more lens having a diameter of no more than 10 mm. In this case, the target signals may be set to represent desired positions that provide OIS of the image focussed on the image sensor on the basis of the output of a vibration sensor that detects vibration of the camera unit. For example, the image sensor may be mounted on the support structure, and the at least one SMA actuator wire may drive movement laterally of an optical axis of the movable element.

In many applications, it is desirable for the target signals to represent desired positions of the movable element with respect to the support structure that vary around a reference target. For example, in OIS it is desirable that the movable element is normally at a reference position that it returns to in the absence of vibration of the camera unit. When an image is captured, movement occurs to stabilise against the shake of the camera.

For such applications, the target signals may represent desired positions that vary around a reference target that is initially centralised within the predetermined spatial envelope. This approach maximises the range of movement on both sides of the reference target, as described above.

In this case, the method may further comprise, in response to detecting a motion limit, adjusting the reference target to be centralised within the adjusted spatial envelope, as well as adjusting the spatial envelope. This provides the advantage of equalising the available range of motion which is available on each side of the reference target.

Various approaches for initially setting the reference target may be applied.

In a first approach, the reference target may be set to a value stored during a previous use of the SMA actuation assembly. As there is likely to be a relatively small variation between two uses of the SMA actuation assembly, this provides a reasonably accurate reference target, based on the previous use. However, this first approach requires the value during a previous use of the SMA actuation assembly to be stored, and so applies a memory requirement that may not be available for a low cost design.

In a second approach, the reference target may have a predetermined value that is measured during manufacture. This approach will not accommodate variance over the lifetime of the SMA actuator assembly, but that is acceptable due to the dynamic adjustment of the spatial envelope.

In a third approach, the method may further comprise initially supplying an initial drive signal having a predetermined power to the at least one SMA actuator wire, deriving an initial measure of resistance of the at least one SMA actuator wire when the initial drive signal is applied, and setting the initial value of the reference target to correspond to the initial measure of resistance. This allows the target reference to be set dynamically on every use, which accommodates variance.

Where the target signals comprise target measures of resistance of each of the SMA actuator wires and the feedback signals comprise the derived measures of resistance of each of the SMA actuator wires, then the initial value of the reference target in respect of each of the SMA actuator wires may be the same.

According to a second aspect of the present invention, there is provided an SMA actuation assembly comprising: a support structure; a movable element; at least one SMA actuator wire connected in tension between the support structure and the movable element in an arrangement capable of driving movement of the movable element with respect to the support structure; and a control circuit arranged to implement a method similar to the first aspect of the invention. Such an SMA actuation assembly provides similar advantages to those described above for the first aspect of the invention. Features applicable to the first aspect of the invention may be applied equally to the second aspect of the invention.

To allow better understanding, an embodiment of the present invention will now be described by way of non-limitative example with reference to the accompanying drawings, in which:

FIGS. 7 and 8 are diagrams of two different forms of the control circuit of any of the SMA actuation assemblies;

Figure 1:
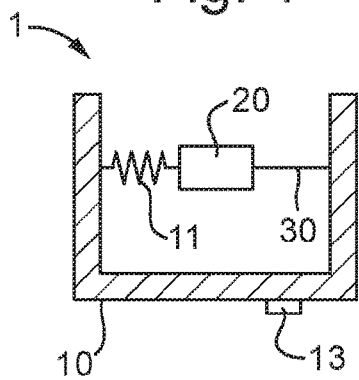
FIG. 1 is a side view of a first SMA actuation assembly.

Five SMA actuation assemblies to which the present invention may be applied are shown in FIGS. 1 to 6 and will now be described. These SMA actuation assemblies share common elements that will be given common reference numerals for ease of reference.

The first SMA actuation assembly 1 shown in FIG. 1 is arranged as follows.

The first SMA actuation assembly 1 comprises a support structure 10 and a movable element 20 suspended on the support structure 10 by a resilient member 11 connected between the support structure 10 and the movable element 20. The resilient member 11 may be a spring or any other type of resilient member, for example a flexure.

A single SMA actuator wire 30 is connected in tension between the support structure 10 and the movable element 20. The SMA actuator wire 30 is capable of driving movement of the movable element 20 with respect to the support structure 10, with the resilient member 11 acting as a resilient biasing means that opposes the force applied by the SMA actuator wire 30. Accordingly, the resilient member 11 tensions the SMA actuator wire 30 and produces movement in the opposite direction to the SMA actuator wire 30 when the stress in the SMA actuator wire 30 reduces. In the example shown in FIG. 1, the resilient member 11 is in tension, but resilient member 11 could be arranged on the same side of the movable element 20 as the SMA actuator wire 30 and in compression.

Resilient biasing means are often used to apply a tensioning force to an SMA actuator wire, but as an alternative plural SMA actuator wires may be used in an arrangement including opposed SMA actuator wires that drive movement of the movable element 10 in opposite directions within one or more degrees of freedom. The second to fifth SMA actuation assemblies 2-5 are examples of this.

In each of the second to fifth SMA actuation assemblies 2-5, plural SMA actuator wires 30 are connected in tension between the support structure 10 and the movable element 20. In these examples, the movable element 20 may be suspended on the support structure 10 exclusively by the SMA actuator wires 30. Alternatively, the movable element 20 may be suspended on the support structure 10 by a suspension system (not shown) that may have any suitable form for allowing movement of the movable element 20 with respect to the support structure 10 with the desired degrees of freedom, for example formed by flexures to allow movement in three dimensions, or formed by ball bearings or sliding bearings to allow movement in two dimensions while constraining movement in a third dimension.

Figure 2:
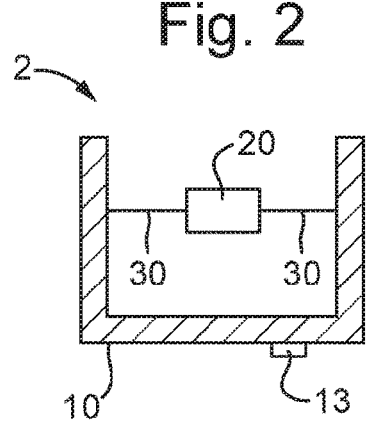
FIG. 2 is a side view of a second SMA actuation assembly.

The second SMA actuation assembly 2 shown in FIG. 2 is arranged as follows.

The second SMA actuation assembly 2 comprises a support structure 10 and a movable element 20 suspended on the support structure 10, as well as two SMA actuator wires 30 connected collinearly in tension between the support structure 10 and the movable element 20. The SMA actuator wires 30 are opposed and drive movement of the movable element 10 in opposite directions within a single degree of freedom, that is translation movement along a single axis.

Instead of two SMA actuator wires 30 arranged collinearly, larger numbers of SMA actuator wires 30 may be connected in other geometrical arrangements where opposed SMA actuator wires 30 drive movement of the movable element 10 in opposite directions within more than one degree of freedom, including translational movement along orthogonal axes and/or rotational movement about orthogonal axes. In these cases, each SMA actuator wire 30 may contribute to motion with a translational degree of freedom and or a rotational degree of freedom. Different subsets of SMA actuator wires 30 are opposed with respect to each degree of freedom and motion in each degree of freedom is achieved by differential contraction of the different subsets of SMA actuator wires 30. By selective control of the individual SMA actuator wires 30 according to their geometrical arrangement any desired motion within any of the degrees of freedom may be achieved.

The third to fifth SMA actuator arrangements 3-5 are non-limitative examples where plural SMA actuator wires 30 are provided in an arrangement in which the SMA actuator wires 30 are capable of driving movement of the movable element 20 with respect to the support structure 10 with plural degrees of freedom.

Figure 3:
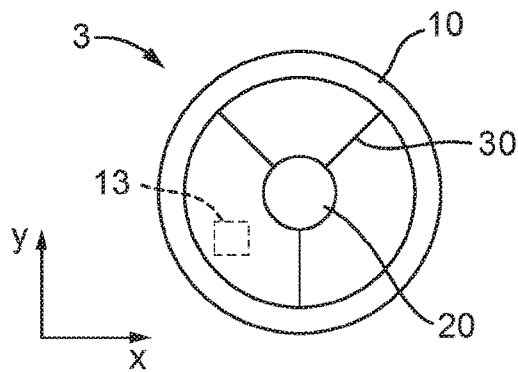
FIG. 3 is a side view of a third SMA actuation assembly.

The third SMA actuation assembly 3 shown in FIG. 3 is arranged as follows.

The second SMA actuation assembly 2 comprises a support structure 10 and a movable element 20 suspended on the support structure 10, as well as three SMA actuator wires 30 connected in tension between the support structure 10 and the movable element 20. The three SMA actuator wires 30 are angularly spaced around the movable element, and thus are opposed in opposite directions within a two degrees of freedom, that is a translation movement along orthogonal axes, e.g. x and y axes as shown. Along the x axis, the upper pair of SMA actuator wires 30 are opposed to each other and drive movement by differential contraction therebetween. Along the y axis, the upper pair of SMA actuator wires 30 together are opposed to the lower SMA actuator wire 30 and drive movement by differential contraction therebetween, the upper pair of SMA actuator wires 30 acting together with a component of their contraction resolved along the y axis.

The fourth and fifth SMA actuation assemblies 4, 5 shown in FIGS. 4 and 5 have respective arrangements of SMA actuators wires 30 that are described further below.

Figure 6:
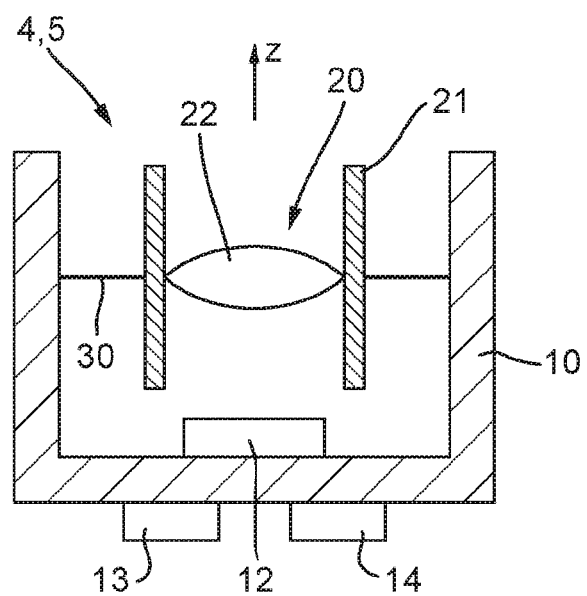
FIG. 6 is a schematic view of the fourth or fifth SMA actuation assembly applied in a camera unit.

Each of the fourth and fifth SMA actuation assemblies 4, 5 may be a camera unit as shown in FIG. 6 and arranged as follows.

The SMA actuation assembly 4, 5 comprises a support structure 10 having an image sensor 12 mounted thereon. A movable element 20 comprises a camera lens element suspended on the support structure 10 and is arranged to focus an image on the image sensor 12. The movable element 20 comprises a lens carrier 21 in which is mounted one or more lenses 22, a single lens being illustrated in FIG. 6 for clarity. The SMA actuation assembly 4, 5 is a miniature camera unit in which the one or more lenses 22 has a diameter of no more than 10 mm.

As described below, the SMA actuation assembly 4, 5 are each capable of driving movement laterally of the optical axis of the movable element, being the z axis as shown. Control is implemented as described further below to move the movable element 20 laterally to provide OIS of the image focussed on the image sensor on the basis of the output of a vibration sensor 13 that detects vibration of the SMA actuation assembly 4, 5. The vibration sensor 13 may be mounted on the support structure and detects the vibrations that the SMA actuation assembly 4, 5. The vibration sensor 13 may be a gyroscope sensor which detects the angular velocity of the SMA actuation assembly 1 in three dimensions or an accelerometer which detect motion allowing the orientation and/or position to be inferred.

Although FIG. 6 illustrates an example where the SMA actuation assembly 4, 5 is a camera unit, that is not limitative and in general the SMA actuation assembly 4, 5 may be applied to any type of movable element 20.

Figure 4:
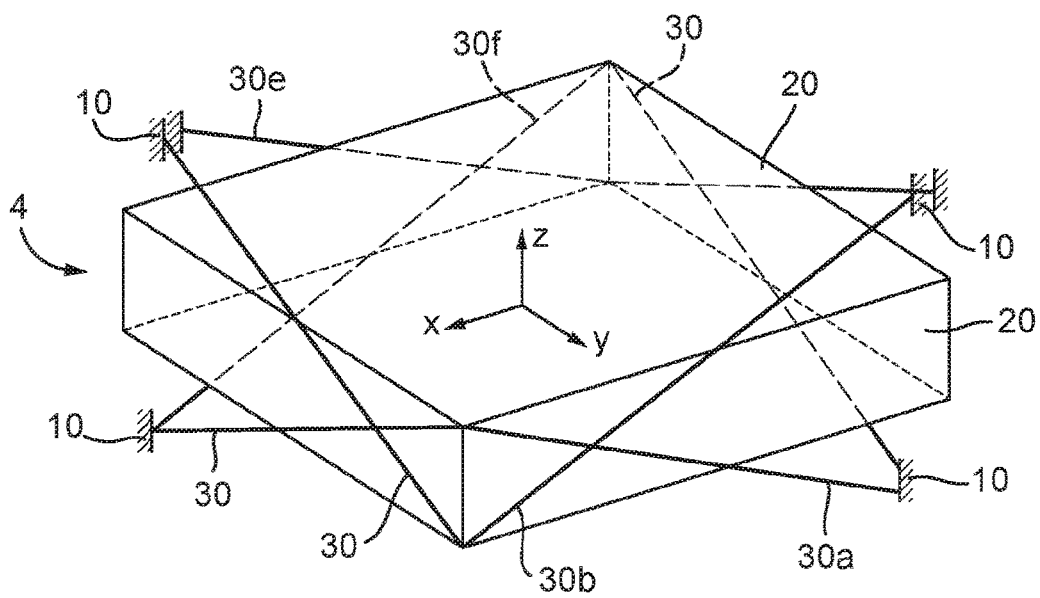
FIG. 4 is a perspective view of a fourth SMA actuation assembly.

The fourth SMA actuation assembly 4 shown in FIG. 4 is arranged as follows.

The fourth SMA actuation assembly 4 comprises a support structure 10 and a movable element 20 suspended on the support structure 10, as well as eight SMA actuator wires 30 connected in tension between the support structure 10 and the movable element 20. The SMA actuator wires 30 are opposed and drive movement of the movable element 10 in opposite directions within six degrees of freedom, that is translation movement along a three orthogonal axes and rotational movement around three orthogonal axes.

The fourth SMA actuation assembly 4 may have a construction as described in further detail in any of WO-2011/104518, WO-2012/066285 or WO-2014/076463, to which reference is made. However, an overview of the arrangement of SMA actuator wires 30 is as follows.

Two SMA actuator wires 30 are provided on each of four sides of the movable element 20 in a 2-fold rotationally symmetric arrangement.

Each SMA actuator wire 30 extends perpendicular to a line radial of the optical axis of the movable element 20, that is substantially perpendicular to the x axis or to the y axis. However, the SMA actuator wires 30 are inclined with respect the z axis of the movable element 20, so that they each provide a component of force along the z axis and a component of force primarily along the x axis or primarily along the y axis.

Each SMA actuator wires 30 is connected at one end to the support structure 10 and at the other end to the movable element 20, selected so that in combination with the inclination of the SMA actuator wires 30, different SMA actuator wires 30 provide components of force in different directions along the z axis and different directions along the x axis or along the y axis. In particular, the pair of SMA actuator wires 30 on any given side of the movable element 20 are connected to provide components of force in opposite directions along the z axis, but in the same direction along the x axis or along the y axis. The two pairs of SMA actuator wires 30 on opposite sides of the movable element 20 are connected to provide components of force in opposite directions along the x axis or along the y axis.

Thus, the SMA actuator wires 30 are capable, on selective contraction, of driving movement of the movable element 20 with respect to the support structure 10 in translational movement with three degrees of freedom (i.e. along the x, y and z axes) and also rotational movement with three degrees of freedom (i.e. rotations around the x, y and z axes). Due to the symmetrical arrangement, movement with each of the degrees of freedom is driven by contraction of different combinations of SMA actuator wires 30. As the movements add linearly, movement to any translational and/or rotational position within the six degrees of freedom is driven by a linear combination of contractions of the SMA actuator wires 30. Thus, the translational and rotational position of the movable element 30 is controlled by controlling the drive signals applied to each SMA actuator wire 30.

In use, translational movement along the optical axis of the movable element 20 (i.e. along the z axis) may be used to change the focus of an image formed by the movable element 20 and translational movement laterally of the optical axis of the movable element 20 (i.e. along the x and y axes) may be used to provide OIS. In that case, it is desired that there is no rotational movement around the x or y axis. As the rotational position is derived by the contractions of the SMA actuator wires 30 this effectively requires control of drive signals to provide a constant rotational position.

Figure 5:
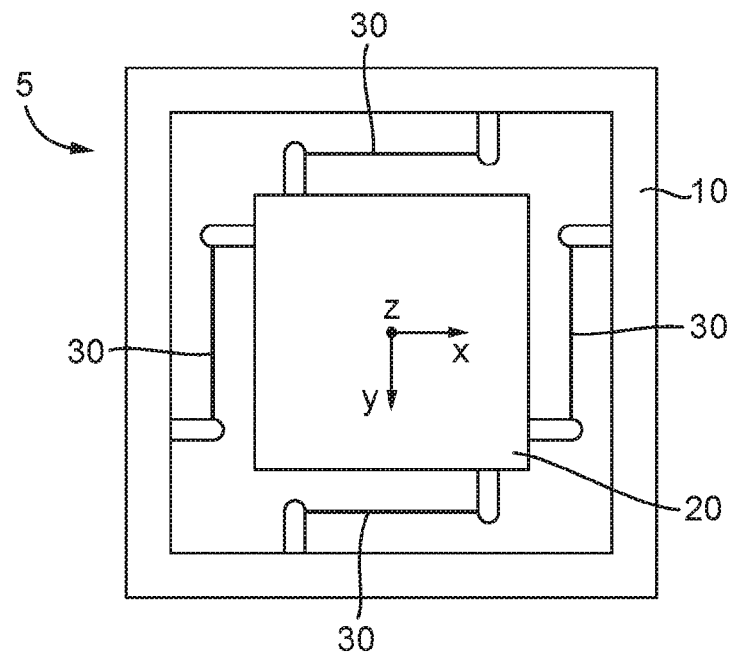
FIG. 5 is a plan view of a fifth SMA actuation assembly.

The fifth SMA actuation assembly 5 shown in FIG. 5 is arranged as follows.

The fifth SMA actuation assembly 5 comprises a support structure 10 and a movable element 20 suspended on the support structure 10, as well as four SMA actuator wires 30 connected in tension between the support structure 10 and the movable element 20. The SMA actuator wires 30 are opposed and drive movement of the movable element 10 in opposite directions within six degrees of freedom, that is translation movement along a three orthogonal axes and rotational movement around three orthogonal axes.

The fifth SMA actuation assembly 5 may have a construction as described in further detail in any of WO-2013/175197 or WO-2014/083318, to which reference is made.

However, an overview of the arrangement of SMA actuator wires 30 is as follows.

In the fifth SMA actuation assembly 5, movement of the movable element 20 with respect to the support structure 10 along the along the z axis is constrained mechanically, for example by a suspension system which supports the movable element 20 on the support structure 10, which may comprise beams as disclosed in WO-2013/175197, ball bearings as disclosed in WO-2014/083318, or a sliding bearing. Thus less SMA actuator wires 30 are provided with a simpler arrangement as it is not necessary to drive movement along the optical axis.

One SMA actuator wire 30 is provided on each of four sides of the movable element 20 in a 2-fold rotationally symmetric arrangement. Each SMA actuator wire 30 extends substantially perpendicular to a line radial of the optical axis of the movable element 20, that is substantially perpendicular to the x axis or to the y axis and thus provides a component of force primarily along the x axis or primarily along the y axis. Each SMA actuator wires 30 is connected at one end to the support structure 10 and at the other end to the movable element 20. The ends at which the SMA actuator wires 30 are connected to the support structure 10 alternate on successive sides around the z axis. As a result, the pairs of SMA actuator wires 30 on opposing sides provide a component of force in opposite directions along the x axis or in opposite directions along the y axis. However, the torques applied by two pairs of SMA actuator wires 30 are in opposite directions around optical axis (z axis).

Thus, the SMA actuator wires 30 are capable, on selective contraction, of driving movement of the movable element 20 with respect to the support structure 10 to translational movement with two degrees of freedom (i.e. along the x and y axes) and also rotational movement with one degrees of freedom (i.e. around the z axis). Due to the symmetrical arrangement, movement with each of the degrees of freedom is driven by contraction of different combinations of SMA actuator wires 30. As the movements add linearly, movement to any translational and/or rotational position within the three degrees of freedom is driven by a linear combination of contractions of the SMA actuator wires 30. Thus, the translational and rotational position of the movable element 30 is controlled by controlling the drive signals applied to each SMA actuator wire 30.

In use, translational movement laterally of the optical axis of the movable element 20 (i.e. along the x and y axes) may be used to provide OIS. In that case, it is may be desired that there is no rotational movement around the optical axis or it may be that the rotation around the optical axis is varied, which may depend on the nature of the suspension system. As the rotational position is derived by the contractions of the SMA actuator wires 30 this effectively requires control of drive signals to provide a constant rotational position.

Each of the first to fifth SMA actuator assemblies 1-5 further includes an integrated circuit chip 14 mounted on the support structure 10 and in which is implemented a control circuit 50 which may take the form shown in either of FIG. 7 or 8. In both forms, the control circuit 50 is connected to the SMA actuator wires 30 and is arranged to supply respective drive signals to each of the SMA actuator wires 30. The following description refers to the case of plural SMA actuator wires 30 for simplicity, but may be applied equally to the first SMA actuator assembly 1 that has a single SMA actuator wire 30.

In the following description, N is the number of SMA actuator wires 30 and n is used as a subscript label to identify signals in respect of each SMA actuator wire 30, whereas M is the number of degrees of freedom in which the arrangement of SMA actuator wires 30 are capable of driving movement and m is used as a subscript label to identify signals in respect of each degree of freedom.

The first form of the control circuit 50 shown in FIG. 7 applies resistance-based closed loop control as follows, using feedback signals that are measures of resistance of each of the SMA actuator wires and target signals that are target measures of resistance of each of the SMA actuator wires.

The control circuit 50 includes a drive circuit 51 arranged to generate a drive signal $Drive_n$ for each SMA actuator wire 30 in accordance with a control signal $Cont_n$ for each SMA actuator wire 30 which is supplied thereto. The drive circuit 51 is connected to each SMA actuator wire 30 and supplies the drive signal $Drive_n$ thereto. The drive circuit 51 may be a constant-voltage current source or a constant-current current source. For example, in the latter case the constant current might be of the order of 120 mA. In this example, the drive signals $Drive_n$ generated by the drive circuit 51 are pulse-width modulation (PWM) signals, and so the PWM duty cycle of each drive signal $Drive_n$ is varied by the drive circuit 51 to vary the power in accordance with the respective control signal $Cont_n$. More generally, the power of the drive signals $Drive_n$ could be varied in other ways, for example by varying the voltage and/or current of the drive signals $Drive_n$.

The following parts of the control circuit 50 operate while the drive signals $Drive_n$ are supplied to the SMA actuator wires 30.

The control circuit 50 includes a detection circuit 52 which detects measures of resistance $R_n$ in respect of each SMA actuator wire 30. In the first form of the control circuit 50, the measures of resistance $R_n$ are themselves used as the feedback signals for the for the closed loop control, as described below.

The detection circuit 52 may be connected across each SMA actuator wire 30. In the case that the drive circuit 51 is a constant-current current source, the detection circuit 52 may be a voltage detection circuit operable to detect the voltage across each SMA actuator wire 30 which is a measure of the resistance $R_n$ of the SMA actuator wire 30. In the case that the drive circuit 51 is a constant-voltage current source, the detection circuit 52 may be a current detection circuit. For a higher degree of accuracy, the detection circuit 52 may comprise a voltage detection circuit and a current detection circuit operable to detect both the voltage and current across each SMA actuator and to derive a measure of resistance $R_n$ as the ratio thereof.

Alternatively, the SMA actuator wires 30 may be connected together at the movable element, in which case the drive circuit 51 may generate drive signals $Drive_n$ and the detection circuit 52 may detect measures of resistance $R_n$ using techniques of the type disclosed in WO-2012/066285.

The control circuit 50 includes a motion control block 53 which sets target signals $Rtarget_n$ in respect of each SMA actuator wire 30. As the feedback signals are measures of resistance $R_n$ of the SMA actuator wires 30, the target signals $Rtarget_n$ correspond to desired resistances in respect of each SMA actuator wire 30.

The target signals $Rtarget_n$ represent a desired position of the movable element 20 with respect to the support structure 10, taking account of the geometrical arrangement of the SMA actuator wires 30. Where the desired position of the movable element 20 is represented with respect to the M degrees of freedom, the target signals $Rtarget_n$ may be derived from therefrom using a mathematical transformation based on the geometrical arrangement of the SMA actuator wires 30. The target signals $Rtarget_n$ are set to provide the desired motion in accordance with the application.

As an example, where the application is OIS, the target signals $Rtarget_n$ are set on the basis of the output of the vibration sensor 13 to move the movable element 10 that comprises a camera lens element to provide OIS.

In the case of the fourth SMA actuation assembly 4, the target signals $Rtarget_n$ may be set to provide:
 a translational position along the x and y axes, i.e. perpendicular to the optical axis, that provides OIS on the basis of the output of the vibration sensor 13;
 a translational movement along the z axis, i.e. the optical axis, that change the focus in a desired manner, for example in accordance with user input or in accordance with the output of an autofocus control system;
 a rotational position around the x and y axes, i.e. perpendicular to the optical axis, that is constant, so that the optical axis of the movable element remains perpendicular to the image sensor 12 for providing a uniform depth of focus across the image; and
 a rotational position around the z axis, i.e. the optical axis, that is constant where this is necessary for the suspension system, although alternatively this may be varied.

In the case of the fifth SMA actuation assembly 5, the target signals $Rtarget_n$ may be set to provide a translational position along the x and y axes, i.e. perpendicular to the optical axis, that provides OIS on the basis of the output of the vibration sensor 13.

The control circuit 50 includes an error block 54 that is supplied with the target signals $Rtarget_n$ and the measures of resistance $R_n$. The error block 54 derives an error signal $E_n$ in respect of each SMA actuator wire 30, representing the error between the target signal $Rtarget_n$ and the measure of resistance $R_n$ in respect of each SMA actuator wire 30.

The control circuit 50 includes a closed loop control block 55 that derives the control signal $Cont_n$ for each SMA actuator wire 30 in accordance with the respective error signal $E_n$. The control block 55 performs closed loop control to vary the power of the drive signals $Drive_n$ so as to reduce the error signals $E_n$ and thereby drive the measures of resistance $R_n$ of the SMA actuator wires 30 to match the target signals $Rtarget_n$. The closed loop control block 55 may implement any suitable closed loop control algorithm, for example proportional-integral-derivative (PID) control.

Optionally, error offsets may be applied, for example by offsetting the target signals $R_n$ prior to supply to the error block 54, by offsetting the measures of resistance $R_n$ used as feedback signals prior to supply to the error block 54, or by offsetting the error signals $E_n$ calculated by the error block 54 itself. Similarly, an offset may be added to the control signals $Cont_n$. Such offsets may be applied for a variety of purposes, for example as follows. Error offsets may have values selected to adjust the actual position of the movable element 20 to match the desired positions represented by the target resistance values taking into account manufacturing tolerances, for example as disclosed in co-pending International Patent Application No. PCT/GB2016/053865. Error offsets may be applied to reduce hysteresis in the manner disclosed in WO-2008/129291. Offsets to the control signals $Cont_n$ may be used to reduce the steady state error in the manner disclosed in WO-2009/071898.

The second form of the control circuit 50 shown in FIG. 8 is applicable to any the SMA actuator assembly comprising SMA actuator wires 30 are in an arrangement including opposed SMA actuator wires capable of driving movement of the movable element in opposite directions within one or more degrees of freedom, for example any of the second to fifth SMA actuator assemblies 2-5.

The second form of the control circuit 50 applies resistance-based closed loop control as follows, using feedback signals that comprise differential measures of resistance in respect of the or each degree of freedom and target signals in respect of the or each degree of freedom. The second form of the control circuit 50 may apply the techniques disclosed in WO 2014/076463.

Apart from that difference, the second form of the control circuit 50 is generally similar to the first form of the control circuit 50, and so common blocks will be given common reference numerals and have the same operation except for the differences described below.

The control circuit 50 includes a drive circuit 51 arranged to generate a drive signal $Drive_n$ for each SMA actuator wire 30 in accordance with a control signal $Cont_n$ for each SMA actuator wire 30 which is supplied thereto. The drive circuit 51 is the same as in the first form of the control circuit 50 as described above.

The control circuit 50 includes a detection circuit 52 which detects measures of resistance $R_n$ in respect of each SMA actuator wire 30 while the drive signals $Drive_n$ are supplied to the SMA actuator wires 30. The detection circuit 52 is the same as in the first form of the control circuit 50 as described above.

In the second form, control circuit 50 further comprises a transform block 56 which is supplied with the measures of resistance $R_n$ from the detection circuit 52. The transform block 56 derives differential signals $R_m$ in respect of each degree of freedom from the measures of resistance $R_n$. The differential signals $R_m$ comprise differential measures of resistance in respect of each degree of freedom that correspond to the position of the movable element 10 within that degree of freedom and are derived from the opposed SMA actuator wires 30 that drive movement within that degree of freedom. Thus, the transform block 56 derives the differential signals $R_m$ from the measures of resistance $R_n$ using a mathematical transformation based on the geometrical arrangement of the SMA actuator wires 30. In the second form of the control circuit 50, the differential signals $R_m$ are used as the feedback signals for the for the closed loop control, as described below.

The control circuit 50 includes a motion control block 53 which sets target signals $Rtarget_m$ in respect of each degree of freedom. As the feedback signals are the differential signals $R_m$ which are differential measures of resistance of the SMA actuator wires 30 that correspond to position within respective degrees of freedom, the target signals $Rtarget_n$ similarly represent a desired position within those degrees of freedom.

The target signals $Rtarget_m$ are set to provide the desired motion in accordance with the application, in a similar manner to the first form of the control circuit 50, as described above.

The control circuit 50 includes an error block 54 that is supplied with the target signals $Rtarget_m$ and the differential signals $R_m$. The error block 54 derives an error signal $E_m$ in respect of each degree of freedom, representing the error between the target signal $Rtarget_m$ and the differential signal $R_m$ in respect of each degree of freedom.

The control circuit 50 includes a closed loop control block 55 that derives the control signal $Cont_n$ for each SMA actuator wire 30 in accordance with the error signals $E_m$ for each degree of freedom. The closed loop control block 55 performs closed loop control to vary the power of the drive signals $Drive_n$ so as to reduce the error signals $E_m$ and thereby drive the differential signals $R_m$ corresponding to position within respective degrees of freedom to match the target signals $Rtarget_m$. The closed loop control block 55 may implement any suitable closed loop control algorithm, for example proportional-integral-derivative (PID) control.

Since the closed loop control is performed on the basis of the differential signals $R_m$ in respect of each degree of freedom, the closed loop control block 55 takes account of the adjusted errors in respect of each degree of freedom affected by the contraction of the SMA actuator wire 30 concerned. This is done using a mathematical transformation based on the geometrical arrangement of the SMA actuator wires 30. This is effectively the inverse relationship from that used by the transform block 56 to derive the differential signals $R_m$ in respect of each degree of freedom.

Another effect of the closed loop control being performed on the basis of the differential signals $R_m$ in respect of each degree of freedom, is that setting of the tension and temperature of the SMA actuator wires 30 may be performed independently of the positional control by varying the average power supplied to each SMA actuator wires 30. Thus, the control signals $Cont_n$ for each SMA actuator wire 30 may represent the relative powers of the respective drive signals $Drive_n$. The drive circuit 51 may then supply drive signals $Drive_n$ that have powers equal to the average power supplied to each of the SMA actuator wires 30 multiplied by the relative powers represented by the control signals $Cont_n$. This has the effect of adjusting the relative amounts by which the powers of the drive signals $Drive_n$ vary from an average power in accordance with the control signals $Cont_n$. The average power may be kept constant during an actuation operation but may be varied between actuations, for example in response to a measure of the ambient temperature, for example as disclosed in more detail in WO-2014/076463. Other methods of combining the tension and position/orientation could be used.

Optionally, offsets may be applied as described above for the first form of the control circuit 50.

The motion control block 53, the error block 54, the closed loop control block 55 and the transform block 56 may be implemented in one or more processors, which may be a common processor notwithstanding that they are illustrated as separate blocks in FIGS. 7 and 8 for ease of understanding.

As described above with either form of the control circuit 50, the target signals $Rtarget_n$ or $Rtarget_m$ are set to provide desired positions of the movable element 10 with respect to the support structure 20 in accordance with the application.

In practice, the range of movement of the movable element 20 is limited by motion limits, being the limit beyond which it is undesirable to move. The motion limits may be the limit beyond which the SMA actuator wires 30 cannot contract or extend, or the length change under the available safe power, or the limit where the motion stops being sufficiently linear to be controlled or to give the desired performance. Generally, the motion limit is the limit of good closed loop control.

Furthermore, to achieve reliability, the motion limits should not be exceeded as there is a risk of structural or functional fatigue if the wire is subjected to either too high a strain or as a result of repeated cyclic loading. The combination of repeated cyclic loading at a high strain can lead to a rapid failure either by fracturing the wire or by a significant loss of the range of movement in the actuator.

However, when such SMA actuation assemblies are manufactured in practice, there may be variance in the response. For example, manufacturing tolerances result in variance between different manufactured SMA actuation assemblies which are nominally the same. Also, there may be variance in the response of the SMA actuator wires over time, for example due to operation in different thermal environments and due to aging over their lifetime. Such variance creates difficulty in controlling an SMA actuator assembly reliably and repeatably, especially while minimising the risk of fatigue, because the motion limits vary.

To tackle this problem, the motion control block 53 sets target signals $Rtarget_n$ or $Rtarget_m$ representing desired positions that vary within a predetermined spatial envelope. Furthermore, dynamic adjustment of the predetermined spatial envelope is performed to restrict the movement to be within the actual motion limits, irrespective of how these might be variable between different manufactured SMA actuation assemblies which are nominally the same and/or over time.

The dynamic adjustment is performed by the motion control block 53 as follows. It has been appreciated that various electrical characteristics of the SMA actuator wires 30 can provide an indication of when a motion limit of the movement of the movable element 10 is reached. Accordingly, the motion control block 53 monitors such electrical characteristics of the SMA actuator wires 30 and detects when a motion limit is reached on the basis thereof.

Various different electrical characteristics may be used, as follows.

Figure 9:
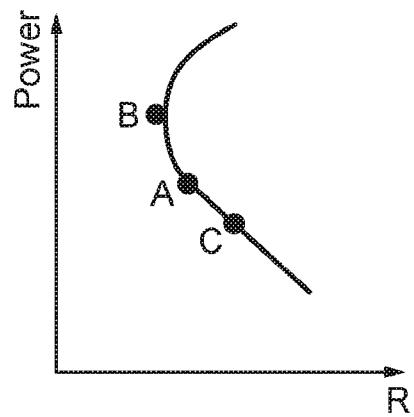
FIG. 9 is a graph of power of a drive signal against resistance for an SMA actuator wire.

When a motion limit is reached, the normal response of the resistance-based closed loop control changes. To illustrate this, FIG. 9 shows an example of how the resistance of an SMA actuator wire 30 varies with the power supplied at one of the motion limits (in this example the motion limit of higher power, but the same applies at the other motion limit).

Below the motion limit (right hand side of FIG. 9) the resistance changes linearly with power. However, the linearity is lost at point A as the curve approaches point B where the resistance is a minimum. Thus, either point A or point B may be considered as a motion limit for resistance-based closed loop control. Point A may be chosen as the motion limit if the priority is positional accuracy to the limits of travel. Point B may be chosen as the motion limit where the maximum amount of travel is desirable, even at the expense of some positional accuracy. A curve similar to FIG. 9 is experienced at a motion limit caused by reaching the end of the phase transformation of the material of an SMA actuator wire 30 or at a motion limit caused by a physical obstruction.

Thus, in general terms, the motion limit may be detected on the basis of the response of the resistance-based closed loop control. For example, it may be detected that a motion limit is reached on the basis of the monitored electrical characteristics being indicative of the closed loop control entering a non-linear region.

The electrical characteristics that are monitored may include the measures of resistance $R_n$ from the detection circuit 52. In the case of the first form of the control circuit 50, that is the feedback signals as shown by short dashed lines. In the case of the second form of the control circuit 50, that is the signals that are supplied to the transform block 56 as shown by short dashed lines.

In another alternative, the electrical characteristics that are monitored may include the differential signals $R_m$ from the transform block 56. In the case of the first form of the control circuit 50, that requires the transform block to be additionally provided as shown by long dashed lines. In the case of the second form of the control circuit 50, that is the feedback signals as shown by long dashed lines.

Thus, depending on the form of the control circuit 50, the electrical characteristics that are monitored may include the measures of resistance $R_n$ and/or the feedback signals.

By way of example, one possibility is also to monitor the power of the drive signals $Drive_n$, as represented by the control signals $Cont_n$ and as shown by the dot-dashed to compare them to the measures of resistance $R_n$ to detect the motion limits, for example based on the curve of the type illustrated in FIG. 9.

In yet another alternative, the electrical characteristics that are monitored may include the error signals $E_n$ in the first form of the control circuit 50 or $E_m$ in the second form of the control circuit 50, for example as shown by the dotted lines in FIGS. 7 and 8. The motion limit can be detected by considering the error signals $E_n$ or $E_m$, and the rate of change of the error signals $E_n$ or $E_m$ or the rate of change of the measures of resistance $R_n$ and/or the feedback signals. The latter rate of change is used to determine if the movement is settled, for example if the rate of change remains below a fixed velocity threshold for a certain period of time. The motion limit is detected, while the movement is settled, the absolute value of the error signals $E_n$ or $E_m$ remains above a fixed error threshold. The wire resistance is deemed settled.

With either of the forms of the control circuit 50, the motion limit may in general be detected in respect of an individual SMA actuator wire 30 or in respect of degree of freedom.

The characteristics of the SMA actuator wires 30 are subject to an amount of noise that depends on the configuration of an individual SMA actuator wire 30, the overall design of the SMA actuation assembly, and the configuration of the control circuit 50. Accordingly, the motion control block 53 applies standard signal processing techniques such as time-based averaging and sampling in the detection of a motion limit. The choice of detection parameters, for example sample rate, settling time, thresholds, etc. may be determined empirically so that the detection of deviation from the linear region, or the absolute limit of travel can be identified with confidence and spurious noise spikes in the data can be adequately discriminated.

In response to detecting such a motion limit, the motion control block 53 adjusts the spatial envelope so as to restrict the movement to be within the detected motion limit. After adjusting the spatial envelope, the motion control block 53 sets target signals $Rtarget_n$ or $Rtarget_m$ representing desired positions that vary within the adjusted spatial envelope. In this manner, the spatial envelope is varied dynamically in use.

This allows the spatial envelope to be initially set to maximise available range of the motion, and need not be restricted to accommodate all possible variance, because the spatial envelope is subsequently adjusted to restrict the movement to be within the motion limits that are detected in use. This is achieved without the need for calibration during a one-off initiation phase or an initial calibration stage after power-up of the SMA actuator assembly.

The adjustment may prevent the movement subsequently reaching the detected motion limit, which may for example be point A or point B in the case of FIG. 9. Alternatively, the adjustment may restrict the spatial envelope to introduce a margin between the subsequent and the detected motion limit, for example preventing motion past point C in the case of FIG. 9.

Optionally, the motion control block 53 may set target signals $Rtarget_n$ or $Rtarget_m$ representing desired positions that vary around a reference target $Rref_n$ or $Rref_m$. This is useful in many applications. For example, this is desirable in the case of OIS, as may achieved for example with the fourth and fifth SMA actuator assemblies 4, 5. In this case, the reference position is the position of the movable element 10 that comprises a camera lens element in the absence of vibration of the camera unit, and movement from that reference position effects OIS.

In the case of the first form of the control circuit, the initial value of the reference target $Rref_n$ in respect of each SMA actuator wire 30 may be the same.

Hereinafter, the reference target $Rref_n$ for each SMA actuator wire 30 and $Rref_m$ for each degree of freedom which will be referred to merely as the reference target Rref for brevity but the description relates to each reference target $Rref_n$ or $Rref_m$. The reference target Rref may be set in various different ways.

In a first approach, the reference target Rref may be set to a stored value. The value may be stored during manufacture, but this does not accommodate variation over the lifetime of the SMA actuation assembly. Thus, performance may be improved by using a value stored during a previous use of the SMA actuation assembly. As there is likely to be a relatively small variation between two uses of the SMA actuation assembly, this provides a reasonably accurate reference target Rref.

Where memory is not available for storage, the reference target Rref may be set after power-up for example by the motion control block 53 performing the following setting method.

Initially, the drive circuit 51 is controlled to supply an initial drive signal having a predetermined power to each of the SMA actuator wires 30, preferably equal powers.

During supply of the initial drive signal, the detection circuit 52 derives an initial measure of resistance of each of the SMA actuator wires 30.

Then the motion control block 53 sets the initial value of the reference target Rref to correspond to the initial measures of resistance. This allows the reference target Rref to be set dynamically on every use, which accommodates variance over the lifetime of the SMA actuation assembly.

Where the motion control block 53 sets target signals $Rtarget_n$ or $Rtarget_m$ representing desired positions that vary around a reference target $Rref_n$ or $Rref_m$, then the reference target $Rref_n$ or $Rref_m$ is initially centralised within the predetermined spatial envelope, with respect to each of the degrees of freedom of the movement driven by the SMA actuator wires 30. This equalises the available range of motion on each side of the reference target $Rref_n$ or $Rref_m$.

In this case, when a motion limit is detected and the spatial envelope is adjusted to restrict the movement to be within the detected motion limit, then depending on the application, either (1) the reference target $Rref_n$ or $Rref_m$ may also be adjusted to be centralised within the adjusted spatial envelope, which is advantageous in cases where it is desirable to have equal range of movement on each side of the reference target $Rref_n$ or $Rref_m$, for example when the application is OIS and the absolute centre of the motion is less important than the range of motion, because a user may adjust the absolute orientation while directing the camera unit at a subject to be imaged, or (2) the reference target $Rref_n$ or $Rref_m$ may maintain the same value, which is advantageous in cases where the absolute position corresponding to the reference target $Rref_n$ or $Rref_m$ is important, although this results range of movement on each side of the reference target $Rref_n$ or $Rref_m$ becomes unequal.

Figure 10:
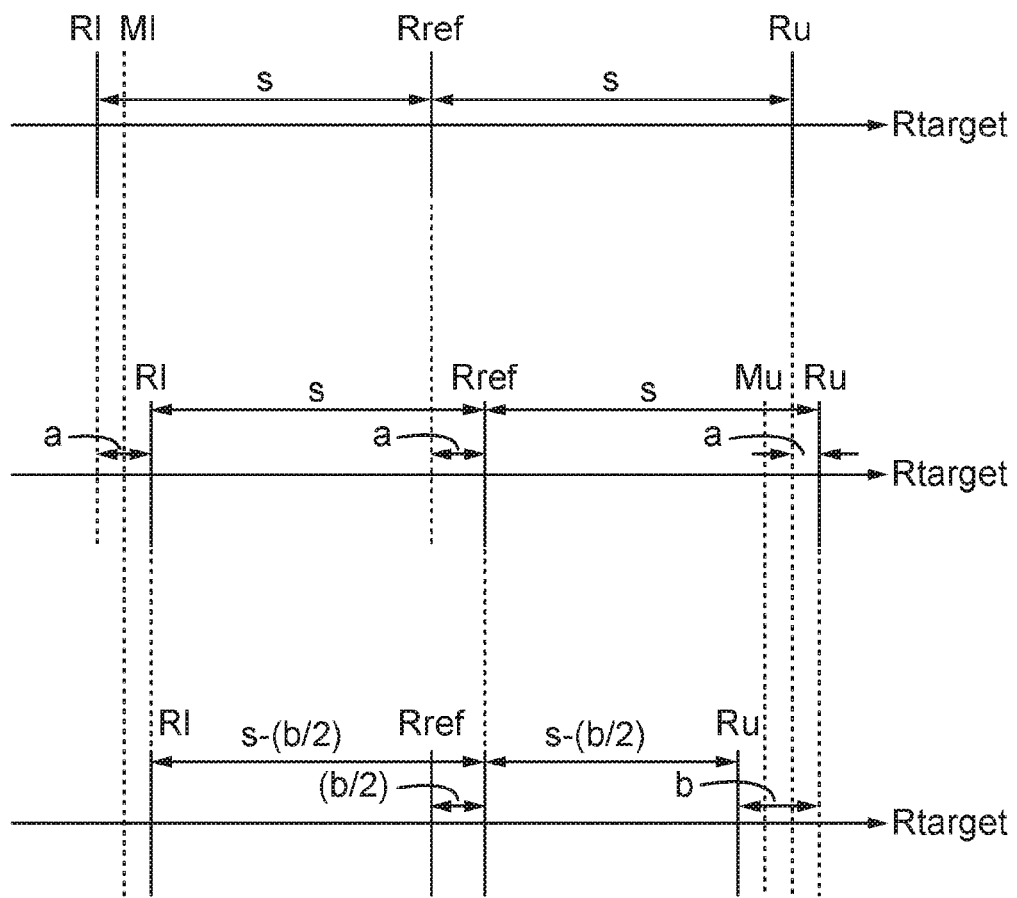
FIG. 10 is a plot of spatial envelopes at three successive stages of an adjustment method.

By way of example, FIG. 10 illustrates a specific example of a method for adjusting the spatial envelope and adjusting the reference target $Rref_m$ for one of the degrees of freedom to maintain it centrally within the adjusted spatial envelope.

In FIG. 10, the target signal $Rtarget_m$ is plotted horizontally, showing the values of both the reference target $Rref_m$ as well as a lower limit Ru and an upper limit Rl of the spatial envelope.

The upper plot of FIG. 10 illustrates the predetermined spatial envelope that is initially set. In this case, the reference target Rref, the lower limit Ru and the upper limit Rl take initial values wherein the reference target Rref is centralised between the lower limit Ru and the upper limit Rl, with an equal available stroke of size s on each side.

The middle plot of FIG. 10 illustrates a first adjustment performed in response to detecting a first motion limit in a first sense with respect to the degree of freedom. In this example, the first motion limit is the lower motion limit Ml, but the converse would apply if the upper motion limit Mu were to be detected first. The spatial envelope is adjusted to restrict the movement to be within the lower motion limit Ml, by adjusting the lower limit Rl of the spatial envelope by an increase of an amount a. At the same time, both the reference target Rref and the upper limit Ru are also adjusted by an increase of the same amount a. This maintains the reference target $Rref_m$ centrally within the spatial envelope and also an equal available stroke of size s on each side of the adjusted reference target $Rref_m$.

The lower plot of FIG. 10 illustrates a second adjustment performed in response to detecting a second motion limit in a second sense with respect to the degree of freedom. In this example, the second motion limit is the upper motion limit Mu, but the converse would apply if the upper motion limit Mu were to be detected first and the lower motion limit Ml second. The spatial envelope is adjusted to restrict the movement to be within the upper motion limit Mu, by adjusting the upper motion limit Ru of the spatial envelope by a decrease of an amount b. At the same time, the reference target Rref is adjusted by a decrease of an amount (b/2) and the lower limit Rl is maintained in view of the lower motion limit Ml previously detected. This maintains the reference target $Rref_m$ centrally within the spatial envelope and also an equal available stroke of reduced size (s−(b/2)) on each side of the adjusted reference target $Rref_m$ that maintains the maximum available stroke equally between the two detected motion limits Ml and Mu with the reference target Rref at the centre of those strokes.

The specific method illustrated with reference to FIG. 6 is not limitative and other methods to centre the reference target resistance value Rref could be applied.

The invention claimed is:

1. A method of controlling an SMA actuation assembly wherein at least one SMA actuator wire is connected in tension between a support structure and a movable element in an arrangement capable of driving movement of the movable element with respect to the support structure, the method comprising:
 while supplying drive signals to the at least one SMA actuator wire to drive said movement:
 setting target signals representing desired positions of the movable element with respect to the support structure that vary within a predetermined spatial envelope;
 deriving measures of resistance of the at least one SMA actuator wire, and
 controlling the power of the drive signals under closed loop control on the basis of the target signals and feedback signals obtained from the derived measures of resistance,
 monitoring electrical characteristics of the at least one SMA actuator wire; and
 detecting on the basis of the monitored electrical characteristics when a motion limit of the movement driven by the at least one SMA actuator wire is reached, and in response thereto adjusting said spatial envelope to restrict the movement to be within the detected motion limit.

2. The method according to claim 1, wherein said detecting of when a motion limit is reached is performed on the basis of the monitored electrical characteristics being indicative of the closed loop control entering a non-linear region.

3. The method according to claim 1, wherein the electrical characteristics that are monitored comprises the derived measures of resistance.

4. The method according to claim 3, wherein the electrical characteristics that are monitored further comprises the powers of the drive signals.

5. The method according to claim 4, wherein said detecting of when a motion limit is reached is performed on the basis of errors between the powers of the drive signals and the derived measures of resistance.

6. The method according to claim 1, wherein the electrical characteristic that is monitored comprises the feedback signals.

7. The method according to claim 6, wherein said detecting of when a motion limit is reached is performed on the basis of errors between the feedback signals and the target signals.

8. The method according to claim 1, wherein the target signals represent desired positions of the movable element with respect to the support structure that vary around a reference target that is initially centralised within the predetermined spatial envelope.

9. The method according to claim 8, wherein the method further comprises initially supplying an initial drive signal having a predetermined power to the at least one SMA actuator wire, deriving an initial measure of resistance of the at least one SMA actuator wire when the initial drive signal is applied, and setting the initial value of the reference target to correspond to the initial measure of resistance, preferably wherein the at least one SMA actuator wire comprises a plurality of SMA actuator wires and the initial drive signals having equal predetermined powers.

10. The method according to claim 8, wherein the method further comprises setting the initial value of the reference target to a value stored during a previous use of the SMA actuation assembly.

11. The method according to claim 8, wherein
 the at least one SMA actuator wire comprises a plurality of SMA actuator wire,
 the measures of resistance are derived in respect of each SMA actuator wire,
 the feedback signals comprise the derived measures of resistance of each of the SMA actuator wires,
 the target signals comprise target measures of resistance of each of the SMA actuator wires, and
 the initial value of the reference target in respect of each of the SMA actuator wires is the same.

12. The method according to claim 8, wherein the method further comprises, in response to detecting a motion limit, adjusting the reference target to be centralised within the adjusted spatial envelope.

13. The method according to claim 8, wherein the method comprises, in response to detecting a first motion limit in a first sense with respect to any degree of freedom, adjusting the predetermined spatial envelope by shifting the predetermined spatial envelope to restrict the movement to be within the first motion limit.

14. The method according to claim 8, wherein the method comprises, in response to detecting a second motion limit in a second sense with respect to the same degree of freedom as the first motion limit, adjusting the spatial envelope by reducing the size of the predetermined spatial envelope to restrict the movement to be within both the first motion limit and the second motion limit.

15. The method according to claim 1, wherein the at least one SMA actuator wire comprises a plurality of SMA actuator wires and the measures of resistance are derived in respect of each SMA actuator wire.

16. The method according to claim 15, wherein the feedback signals comprise the derived measures of resistance of each of the SMA actuator wires, and the target signals comprise target measures of resistance of each of the SMA actuator wires.

17. The method according to claim 15, wherein
 the SMA actuator wires are in an arrangement including opposed SMA actuator wires capable of driving movement of the movable element in opposite directions within one or more degrees of freedom,
 the feedback signals comprise differential measures of resistance in respect of the or each degree of freedom derived from the opposed SMA actuator wires that drive movement within that degree of freedom, and
 the target signals comprise target signals in respect of the or each degree of freedom.

18. The method according to claim 1, wherein the SMA actuation assembly is provided in a camera unit comprising an image sensor, and the movable element comprises a camera lens element arranged to focus an image on the image sensor, preferably wherein the image sensor is mounted on the support structure, and the at least one SMA actuator wire is in an arrangement capable of driving movement laterally of an optical axis of the movable element, and further preferably wherein said target signals represent desired positions that provide optical image stabilisation of the image focussed on the image sensor on the basis of the output of a vibration sensor that detects vibration of the camera unit.

19. The method according to claim 18, wherein the movable element comprises one or more lens having a diameter of no more than 10 mm.

20. An SMA actuation assembly comprising:
  a support structure;
  a movable element;
  at least one SMA actuator wire connected in tension between the support structure and the movable element in an arrangement capable of driving movement of the movable element with respect to the support structure; and
  a control circuit arranged to supply drive signals to the at least one SMA actuator wire, the control circuit being arranged to:
  set target signals representing desired positions of the movable element with respect to the support structure that vary within a predetermined spatial envelope;
  derive measures of resistance of the at least one SMA actuator wire, and
  control the power of the drive signals under closed loop control on the basis of the target signals and feedback signals obtained from the derived measures of resistance,
  monitor electrical characteristics of the at least one SMA actuator wire; and
  detect on the basis of the monitored electrical characteristics when a motion limit of the movement driven by the at least one SMA actuator wire is reached, and in response thereto adjusting said spatial envelope to restrict the movement to be within the detected motion limit.

* * * * *